United States Patent [19]
Dull

[11] Patent Number: 5,676,475
[45] Date of Patent: Oct. 14, 1997

[54] SMART PRINT CARRIAGE INCORPORATING CIRCUITRY FOR PROCESSING DATA

[75] Inventor: Dan J. Dull, San Diego, Calif.

[73] Assignee: Encad, Inc., San Diego, Calif.

[21] Appl. No.: 573,226

[22] Filed: Dec. 15, 1995

[51] Int. Cl.⁶ .................................................. B41J 2/00
[52] U.S. Cl. .................................... 400/174; 400/320
[58] Field of Search .................................. 400/174, 175, 400/279, 320, 322

[56] References Cited

U.S. PATENT DOCUMENTS 4,930,915  6/1990  Kikuchi ............................ 400/175

OTHER PUBLICATIONS

A. Holt Mebane IV, et al. (1992) "Electronic and Firmware Design Of the HP Designjet Drafting Plotter" *Hewlett–Packard Journal*, pp. 16–23.

Primary Examiner—Edgar S. Burr
Assistant Examiner—Steven S. Kelley
Attorney, Agent, or Firm—Knobbe, Martens, Olson & Bear

[57] ABSTRACT

The present patent discloses a method and apparatus for improving communication between print drivers and a host computer. The disclosed method simplifies and standardizes the output data format of the host computer. The disclosed printer processing electronics are placed on a moving "smart" printer carriage in close proximity with the print drivers. The simplification of the host computer output, and the positioning of processing electronics speeds up printing of documents and eliminates the need for substantial intermediate processing electronics between the host computer and the printer carriage.

33 Claims, 9 Drawing Sheets

SMART PRINT CARRIAGE INCORPORATING CIRCUITRY FOR PROCESSING DATA

BACKGROUND OF THE INVENTION

The present invention relates to a "smart" moving printer carriage which processes data from a host computer and directs the operation of a series of print drivers.

Conventional printers receive data from a host computer, process the data on a stationary circuit board or main PCA (main Printed Circuit Assembly), and then send the data to the electronics and print drivers attached to a moving carriage. Most data processing functions, including data decompression, is executed on the main PCA before being sent to the carriage PCA (carriage Printed Circuit assembly) which is mounted on a moving carriage.

A host computer sends data to the main PCA in a printer language, usually either in Hewlett-Packard Graphics language (HPGL), Raster Transfer Language (RTL) or a combination of the two. The host computer, application software and printer driver programs determine which type of printer language is sent by the host computer. In the printer itself, a microprocessor on the main PCA determines which printer language was used by the host computer. The main PCA then converts the transmitted data into a native raster format.

Data transmitted in HPGL format is first converted into a vector list. The vector list is used to derive a native raster form. If the data was sent in RTL, control characters embedded in the RTL data are removed and the RTL data is directly converted into a native raster format. Data sent as a combination of HPGL and RTL is separated into respective HPGL and RTL data sets. Each component is then separately converted to native raster form. The final native raster results are merged together. The data is also decompressed during the conversion from HPGL or RTL to native raster.

After conversion to native raster form, the main PCA microprocessor shuffles the data. Shuffling places the data in a form for direct use by the printheads. The shuffling process adjusts the ordering and flow of data to compensate for printer head arrangement. A multiplexer multiplexes the shuffled data so that line transceivers can transmit the control data for the multiple firing jets. Typically, information for around 200 firing jets must be multiplexed onto a 16-line trailing cable.

Demultiplexers located on the carriage PCA demultiplex the transmitted data for each print jet driver. Registers located on the carriage PCA store the transmitted data. Inkjet driver circuitry uses the data to control firing of the ink nozzle drivers.

A linear optical encoder mounted on the carriage PCA monitors carriage position. This information is sent along the trailing cable to an ASIC located on the main PCA.

Some printers, such as the Hewlett Packard DesignJet Plotter HP C1633A, utilize dual microprocessors and ASICs. One microprocessor and ASIC (application specific integrated circuit) is installed on the carriage PCA, while a second microprocessor and ASIC is mounted on the main PCA. In this arrangement the main PCA microprocessor processes and translates the data. The carriage microprocessor uses the processed information from the microprocessor located on the main PCA and adds additional control information for the print drivers.

The above described traditional method for converting data to printhead usable data is very inefficient. Complicated software routines determine whether the data is HPGL, RTL or a combination of the two. The printer software must separate the HPGL and the RTL into different data sets and handle each data set differently. HPGL data conversion slows down printing because all data must be loaded into memory before printing can begin. Multiplexers are needed to transmit the volume of processed data from the main PCA to the print drivers. The circuitry to achieve all of these functions adds significant expenses to the printer. The complexity of the routine, also increases the likelihood of failures.

A second disadvantage of the complicated routine and circuitry is the necessity for end-user intervention. End-users must currently configure the system to accept various different types of host computer input. A LCD screen and keyboard input connected or located on the printer is currently used to configure the printer system. End users generally dislike the complicated set-up procedure and greatly prefer automatic systems. Incorrect user configuration of the printer results in improper printouts. Any necessary interface with the end-user is best implemented using a graphical user interface, much like an Apple Macintosh system or a Microsoft Windows system. Thus, a simplified system of receiving and converting data is desirable. Such a system would not only simplify the hardware needed to implement the system, it would save users time and aggravation.

A third disadvantage of current systems is that the high speed transmission rates which are required when sending preprocessed data to the printer carriage from a stationary circuit board results in the generation of radio frequency signals which can cause interference. Processing the data on a main PCA and then sending the instructions requires the transmission of large volumes of data that must be precisely timed. Data transfer rates can reach bursts of up to two megabytes/second. Such high speed bursts require high clock cycles and large bandwidths. These high frequency signals can generate radio frequency interference that may interfere with other devices. Because the data is sent in the form of square waves appropriate for use in TTL circuitry, the large volume of data being sent over long cables at high speed also can present accuracy problems related to data integrity.

SUMMARY OF THE INVENTION

An improved apparatus and method for printing data by using a "smart" carriage is disclosed. The integrated "smart" carriage is a moving carriage which contains both the print drivers and the electronics necessary to process the data directly from the host computer thus eliminating the need for a main or stationary PCA. The integrated "smart" carriage processes the host computer data in close proximity with the print drivers thereby eliminating many of the communication problems associated with traditional printer configurations.

In the preferred embodiment, the software print driver on the host computer is adjusted to automatically send data in a native raster format directly to the electronics in the smart carriage. Circuitry mounted on the smart carriage processes the native raster data for use by the print head drivers thereby eliminating the need for a stationary main PCA. Ensuring that the data from the host computer is in a native raster format and placing circuitry which processes native raster format on the same moving print carriage as the print drivers eliminates long-distance transmission of processed information and avoids the need for an intermediate set of line transceivers, mutliplexers and demultiplexers.

The simplification and standardization of the data transfer process allows for the automation of many formerly user determined functions and eliminates the need to configure the printer to accept various types of input. User control features may now be handled by the keyboard and display located on the host computer using a graphical user interface instead of using a separate keyboard and a small LCD monitor on the printer itself. Using the keyboard and screen of the host computer results in a reduction in printer cost. Automation of the data transfer process and using a large, user-friendly graphical interface reduces user stress and error.

Once the information is processed, the electronics on the smart carriage PCA generates instructions for proper paper location and carriage movements. These instructions are sent directly to motors which control movement of the carriage and paper.

DETAILED DESCRIPTION OF THE PREFERRED EMBODIMENT

Figure 1:
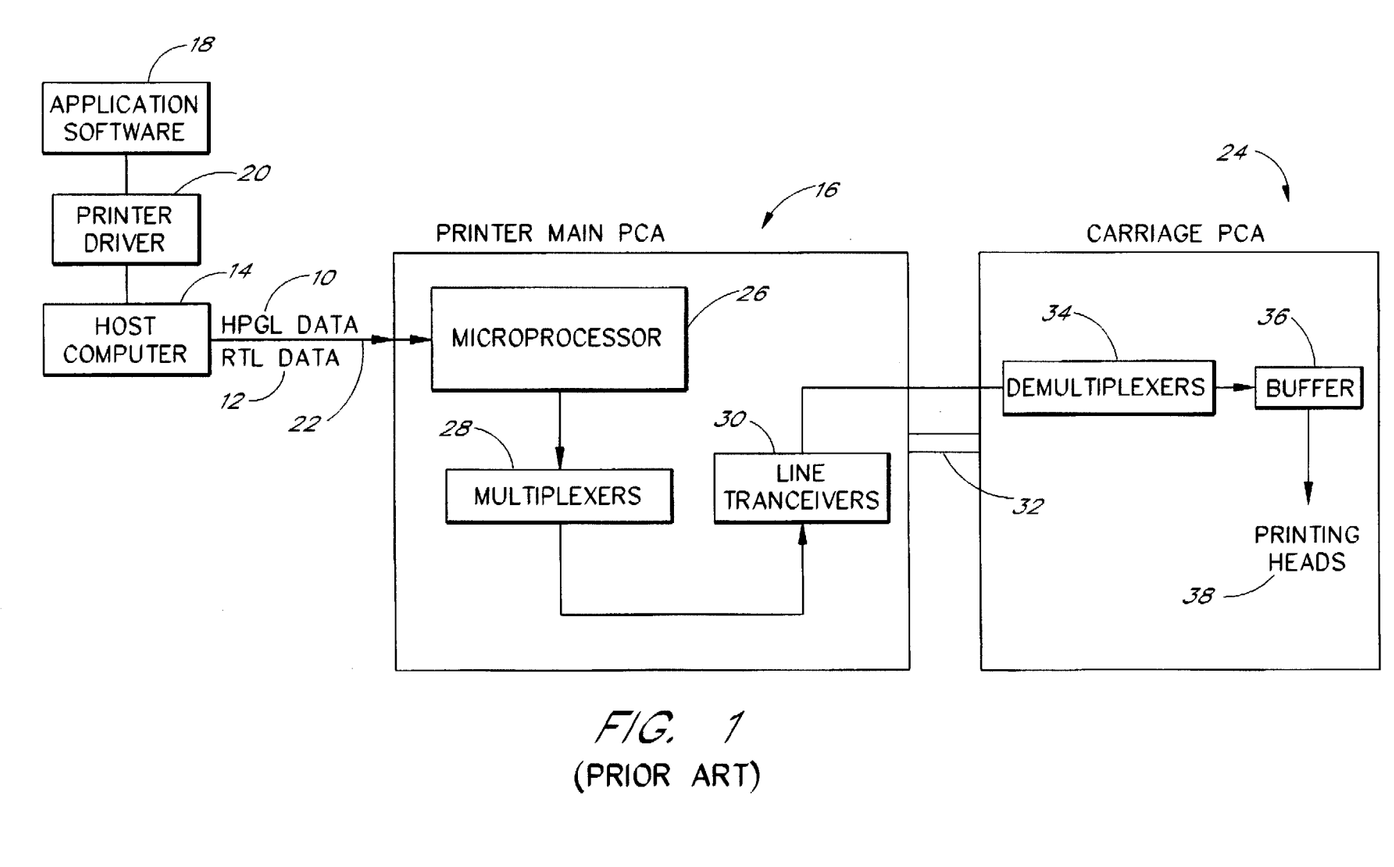
FIG. 1 is a block diagram of the data flow through a prior art printer arrangement.

FIG. 1 illustrates the arrangement used in traditional printer circuits. Information or data 10, 12 is sent from a host computer 14 to a main PCA (main printed circuit assembly) 16 in compressed form. The data from the host computer is usually sent in either a vector form as HPGL 10 (Hewlett Packard graphical language), a formatted raster form such as HP-RTL 12 (Hewlett Packard raster transfer language), or a combination of the two. Which format is used is determined by the applications software 18 and the printer driver 20. The data leaves the host computer along a parallel centronics cable 22.

The main PCA 16 is a stationary circuit board located in the printer. The main PCA 16 processes and decompresses the data from the host computer 14 and then sends the processed decompressed data to the printer carriage PCA 24. The processor 26 in the main PCA first parses, translates, and decompresses the data from the host computer 14 and converts the data into native raster form. The main PCA 16 microprocessor 26 then shuffles the data before multiplexers 28 multiplex the data and line transceivers 30 transmit the data along a trailing cable 32 to the carriage PCA 24. On the carriage PCA 24, a demultiplexer 34 demultiplexes the data and a register 36 stores the data until needed by the print heads 38.

Old Main Printed Circuit Assembly Design

Figure 2:
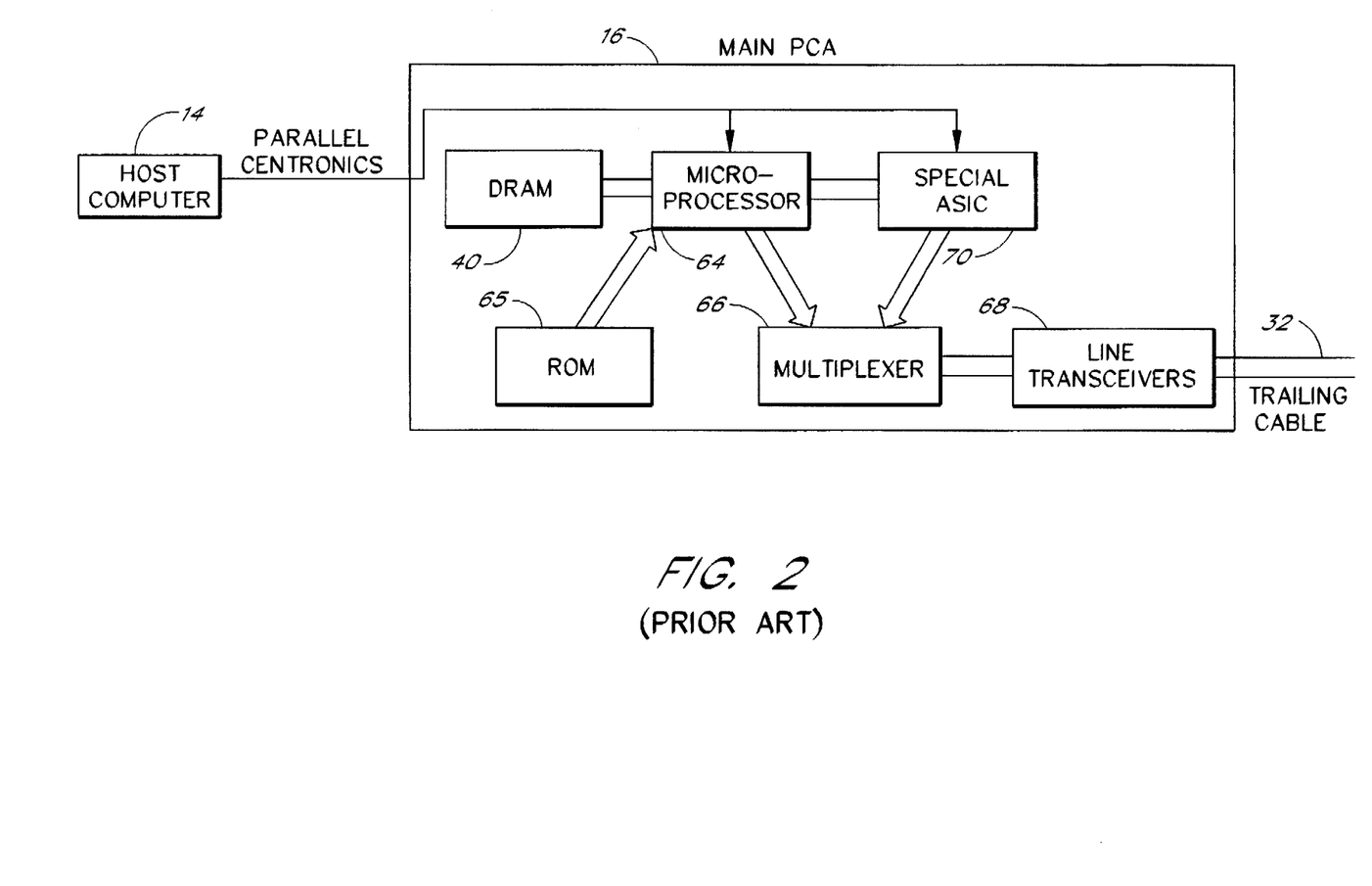
FIG. 2 is a block diagram of the components in a prior art main PCA.

FIG. 2 is a functional block diagram of the main PCA 16 of a traditional printer. Data enters the main PCA 16 from a host computer 14 through its various interfaces such as the RS-232C interface or the Parallel Interface (Centronics) 22.

Figure 3:
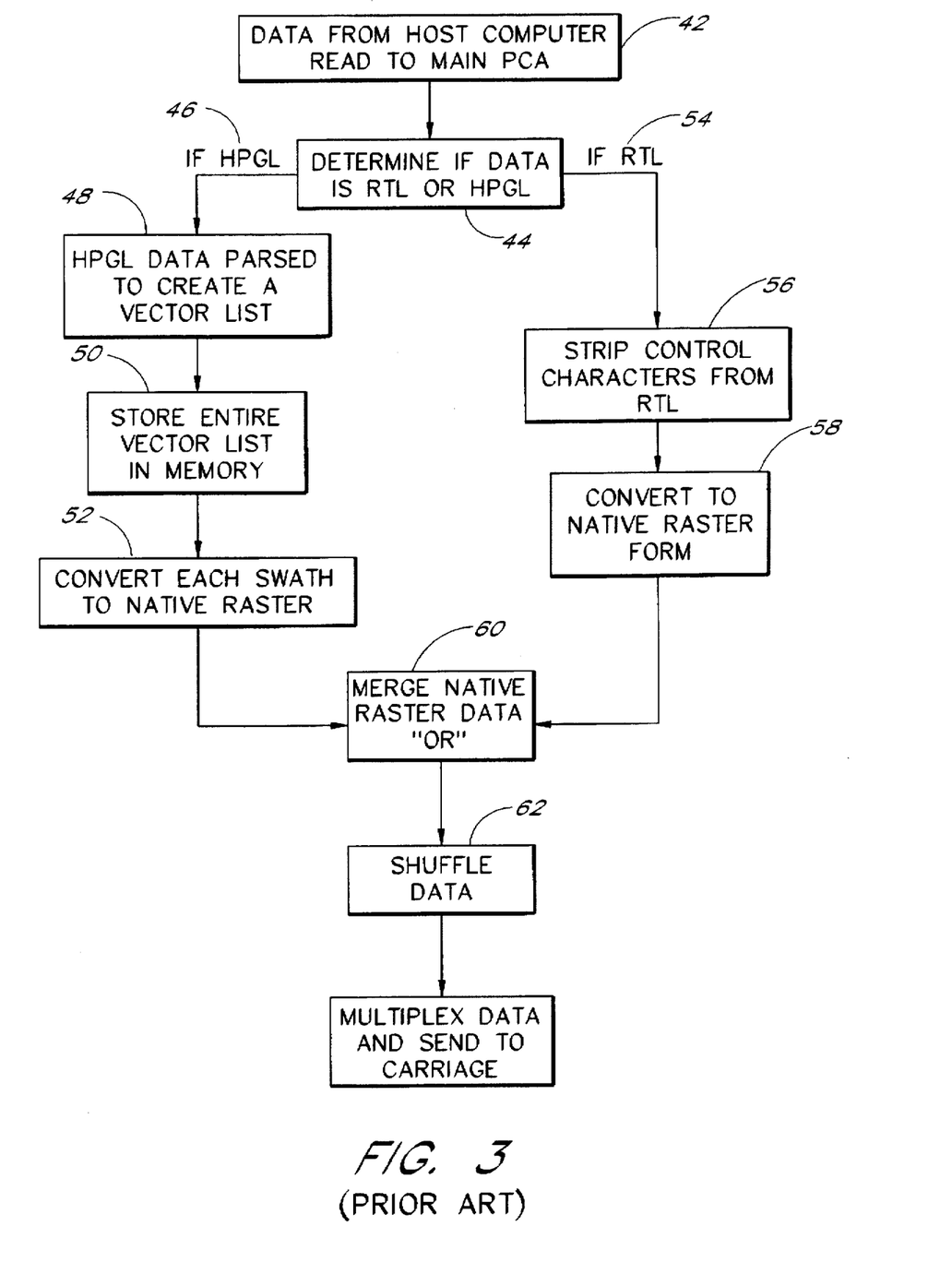
FIG. 3 is a flow diagram of the conversion of host computer data to shuffled native raster data as executed by the prior art.

After the host computer 14 sends data 10, 12 to the main PCA 16, the data is read into DRAM 40 for processing. All data that arrives must be processed and converted into native raster format. The algorithm for processing the data is shown in FIG. 3. Data from the host computer 11 is read into the main PCA. The main PCA then determines if the data 44 was sent in HPGL, RTL, or a combination of the two. The branch of the algorithm taken depends on whether the data was transmitted as HPGL, RTL or a merged HPGL/RTL.

Data which is in HPGL form follows branch 46 of the algorithm. HPGL is a printer language which defines objects such as circles with respect to data points. Data sets which are sent in HPGL format must first be parsed 48 by the main PCA microprocessor. Parsing breaks each object into a series or collection of straight line vectors. The data for the vectors consists of a line width and the coordinates of the two endpoints. This collection of vector data is called a vector list.

The entire vector list must be stored in memory on the main PCA as shown in block 50 before the next step, conversion of the data into native raster form can take place. This massive storage of data creates memory problems because in complicated drawings, the memory in the printer may be insufficient to accommodate the entire vector list. Typically, a printer is shipped with about 4 Megabytes of memory to accommodate the vector list, however, some drawings require over 32 Megabytes of data storage. If the vector list size exceeds available memory, none of the drawing can be printed.

Requiring that all elements of a drawing be loaded into memory before processing and printing slows down the printer process. The printer must wait until data transfer is complete and processing has been finished before printing can begin.

The main PCA microprocessor converts 52 the vector list to a native raster, one swath at a time. A swath is a predetermined height of pixels which extends from border to border across the width of a plot. The native raster is a rendition of the drawing using dots or pixels. In a color printer, each color driver will have its own set of native raster data defining at which points the print driver containing a particular color are to be fired.

Handling RTL and Merged HPGL RTL

RTL, raster transfer language, is a second format used for transferring data from a host computer. In RTL, the data is sent in a raster format with embedded character codes. RTL data is often combined with HPGL data. The main PCA microprocessor is programmed to separate the RTL data from the HPGL data. HPGL data is then processed as described above as shown in branch 46. The RTL data goes through branch 54. The main PCA microprocessor removes 56 the control codes from the RTL data resulting in a native raster file. The data is then converted to a native raster data set as shown in block 58. Native raster results which resulted from RTL processing are then combined or merged with native raster data sets which resulted from HPGL processing using an "OR" operation 60 in which the resulting merged native raster set has an instruction to fire ink if either the RTL or the HPGL data set indicated that ink should be fired.

During the conversion process from either HPGL or RTL, the data is decompressed. RTL data is usually compressed at the host computer using packbits and HPGL data is usually compressed in a PE format. During the conversion of the data from vector to raster each type of data set is appropriately decompressed. This conversion of data to native raster generally requires that the printer microprocessor (1) determine the format of the incoming data 44, (2) separate the incoming data sets, (3) parse the HPGL data, (4) decompress the data, (5) translate the HPGL data by converting the parsed objects into dot patterns, and (6) merge the respective HPGL and RTL data sets. This conversion to native raster is computer intensive. Some designs utilize two microprocessors to parse and convert the data. Other designs integrate the two tasks into a single microprocessor. One printer, the Hewlett Packard Designjet Plotter combines not only the conversion of the data from vector to raster in one chip, but also includes print engine controls in a single, high performance RISC processor, an Intel 80960KA. The system described is disclosed in the article by Mebane IV, Schmedatke, Chen and Kadonaga entitled "Electronic and Firmware Design of the HP DesignJet Drafting Plotter," *Hewlett-Packard Journal*, December 1992, pp. 16–23, hereby incorporated by reference.

Printers which utilize multiple heads require that the data be appropriately shuffled 62 after decompression. In traditional printers, the main PCA microprocessor 64 in FIG. 2 performs the shuffling operation. The shuffling process "fine tunes" the data for actual use by the print heads and involves (1) stripping syntax and overhead characters from the data, (2) converting the stored horizontal strip data into a row of vertical column data, the height of the vertical column data corresponding to the height of the printer head (or the height of a swath of data, typically 8 dots or higher) (3) offsetting the data for each color printhead to compensate for the spacing between printheads and (4) offsetting the data for each printhead to compensate for the mechanic deadband and traveling speed of the carriage. The resulting shuffled data represents the instructions to each of the firing jets on when to turn on and off.

A typical printer has over 200 firing jets. Thus the data must be multiplexed for transmission along the trailing cable connecting the main PCA to the carriage PCA. Multiplexer 66, in FIG. 2 performs this task. Line transceivers 68 send the processed, multiplexed data to the carriage PCA along dual trailing cables. An ASIC 70 controls data flowing out and returning from the carriage. Other methods of carrying the signal besides trailing cable, include sending the signal optically through either free space or through a fiber optic cable.

The Traditional Printer Carriage PCA

Figure 4:
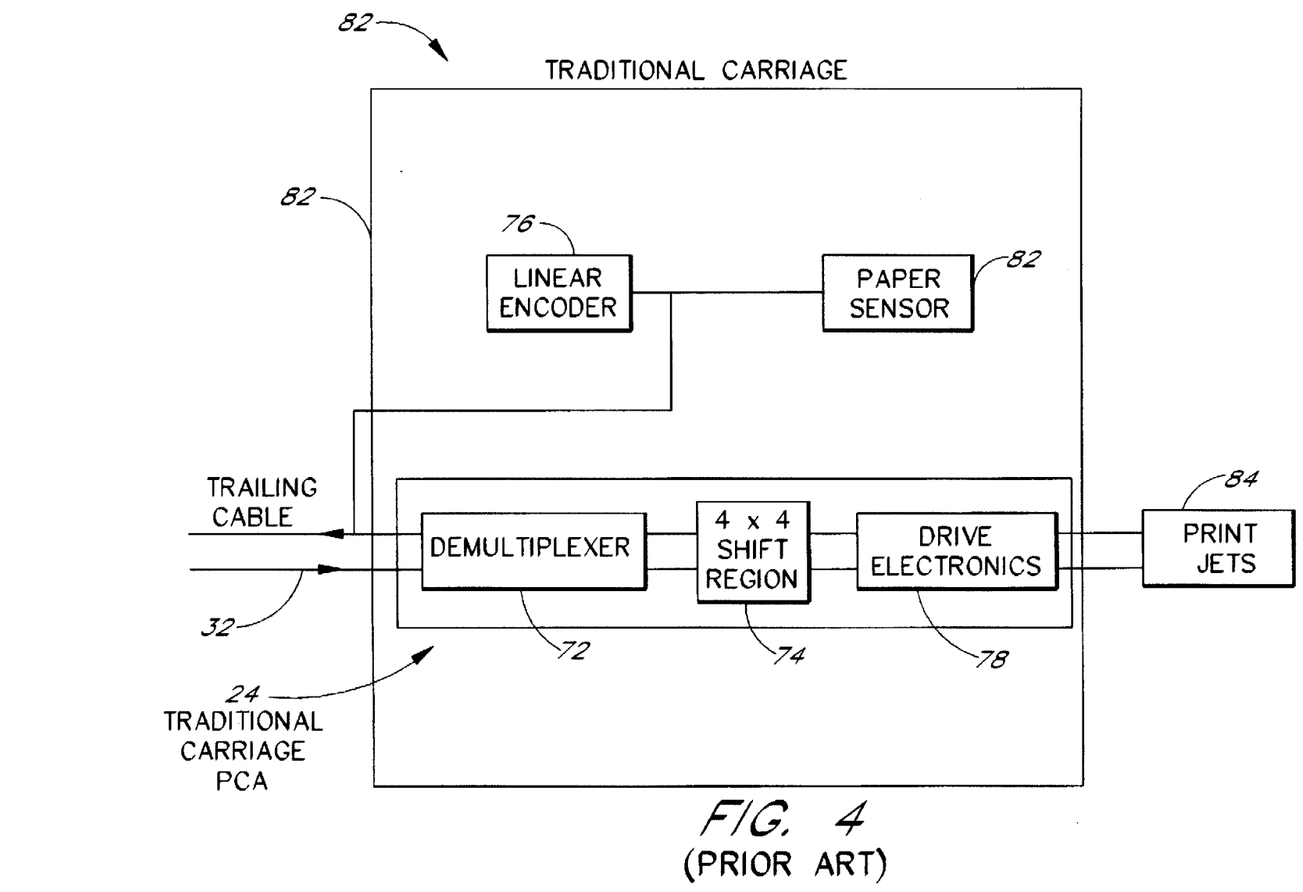
FIG. 4 is a block diagram of the components in a prior art carriage PCA.

FIG. 4 is a detailed block diagram of a traditional printer carriage PCA 24. The carriage PCA includes a demultiplexer 72, drive electronics 78 for the print heads, a linear encoder 76, and a four-bit by four-bit shift register 74 to store data for each simultaneous firing. The printer carriage itself includes print drivers 80, a paper sensor 82, a cover sensor 84, and an optical sensor/encoder 86 for determining horizontal position.

The carriage PCA 24 is mounted on top of the printer carriage 82. Trailing cables 32 enter the carriage PCA 24 where a demultiplexer 72 demultiplexes the information from the main printer PCA 16. The demultiplexed information is stored in a 16-bit shift register 74 where it is used to control the print driver electronics 78. The information in the shift register 74 coordinates switches (not shown) in the drive electronics 78 which fire the jets 84 at each carriage position.

The paper sensor 82 provides information regarding paper status. This information is sent back to the main PCA 16 for processing by the main PCA microprocessor 64 in FIG. 2. An optical sensing system 86 located on the carriage 82 itself determines carriage position. The raw optical sensor data is sent to the carriage PCA 24 where a linear encoder 76 determines the actual carriage position and forwards the information back to the main carriage PCA ASIC 70 in FIG. 2 for monitoring and use in determining carriage movements.

As can be seen from the above description, the processing electronics mounted on the carriage PCA in a traditional printer system are minimal. Information received by the carriage is already processed for direct use by the print driver. Information obtained by sensors located on the carriage is sent back to the main PCA for processing.

The Traditional Interconnect PCA

Figure 5:
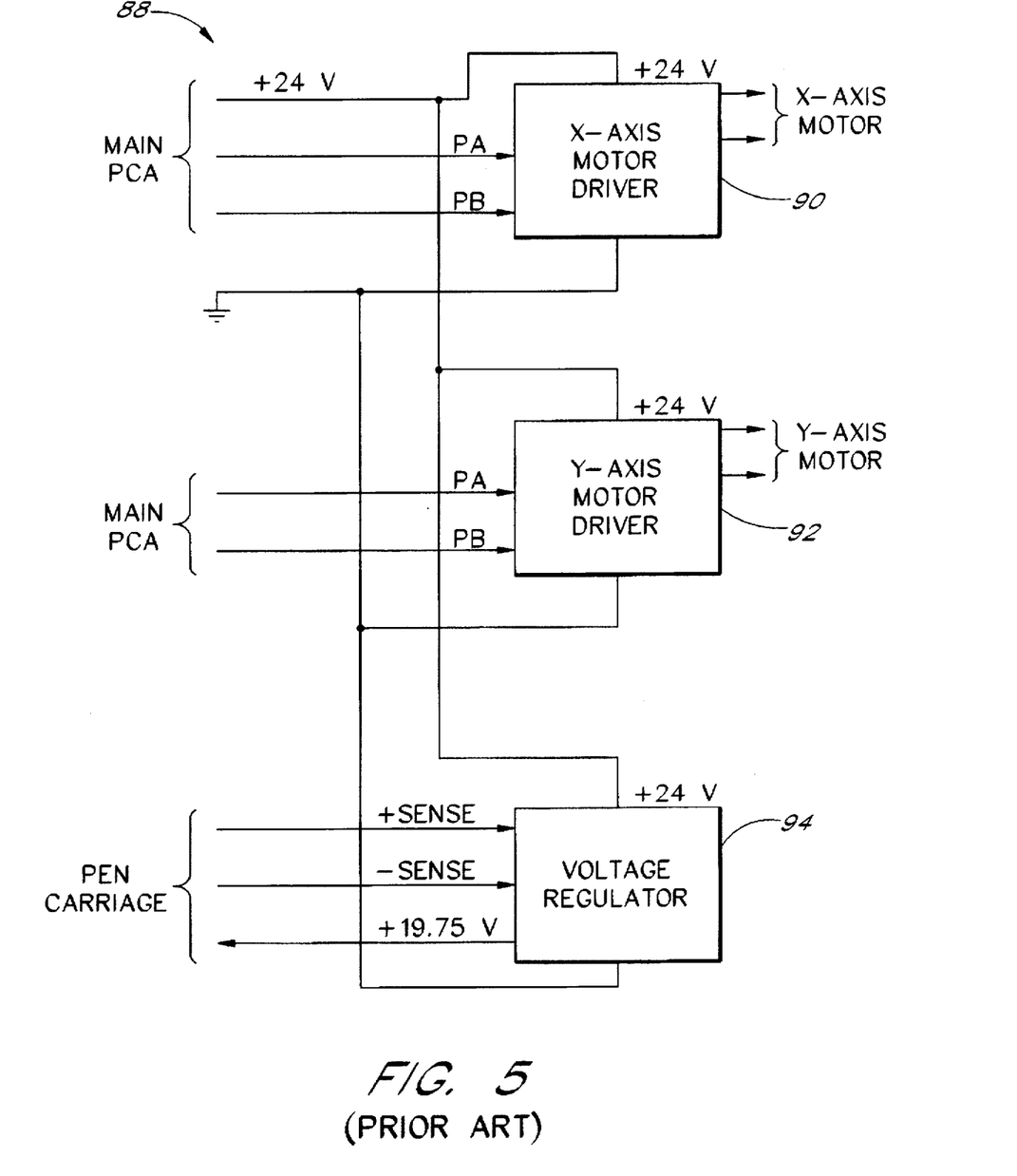
FIG. 5 is a block diagram of a prior art interconnect PCA.

FIG. 5 is a block functional overview of an interconnect PCA 88. The interconnect PCA contains a carriage motor driver 90, a paper motor driver 92, two linear voltage regulators 94 for the print drivers on the carriage and connections to the main PCA. Data received from the main PCA has already been processed. In some prior art designs, the main PCA and the interconnect PCA are combined on one circuit board.

A PCA servo processor (not shown) on the main PCA 16 sends PA and PB drive signals for the paper motor drive 92 and the carriage motor drive 90 mounted on the interconnect PCA 88. These main PCA servo processor signals are used to coordinate firing of the print drivers 86 on the carriage 82 with the movement of the carriage and advancement of the paper. (not shown)

PA and PB are pulse-width-modulated signals. A PA signal to the paper motor driver causes the paper motor to drive the paper up, while a PB signal to the paper motor drive causes the paper motor to drive the paper down. Likewise, a PA signal to the carriage motor driver causes the carriage motor to drive the carriage towards the right side of the plotter while a PB signal to the carriage motor driver causes the carriage motor to drive the carriage towards the left side of the plotter.

User Interface

Figure 6:
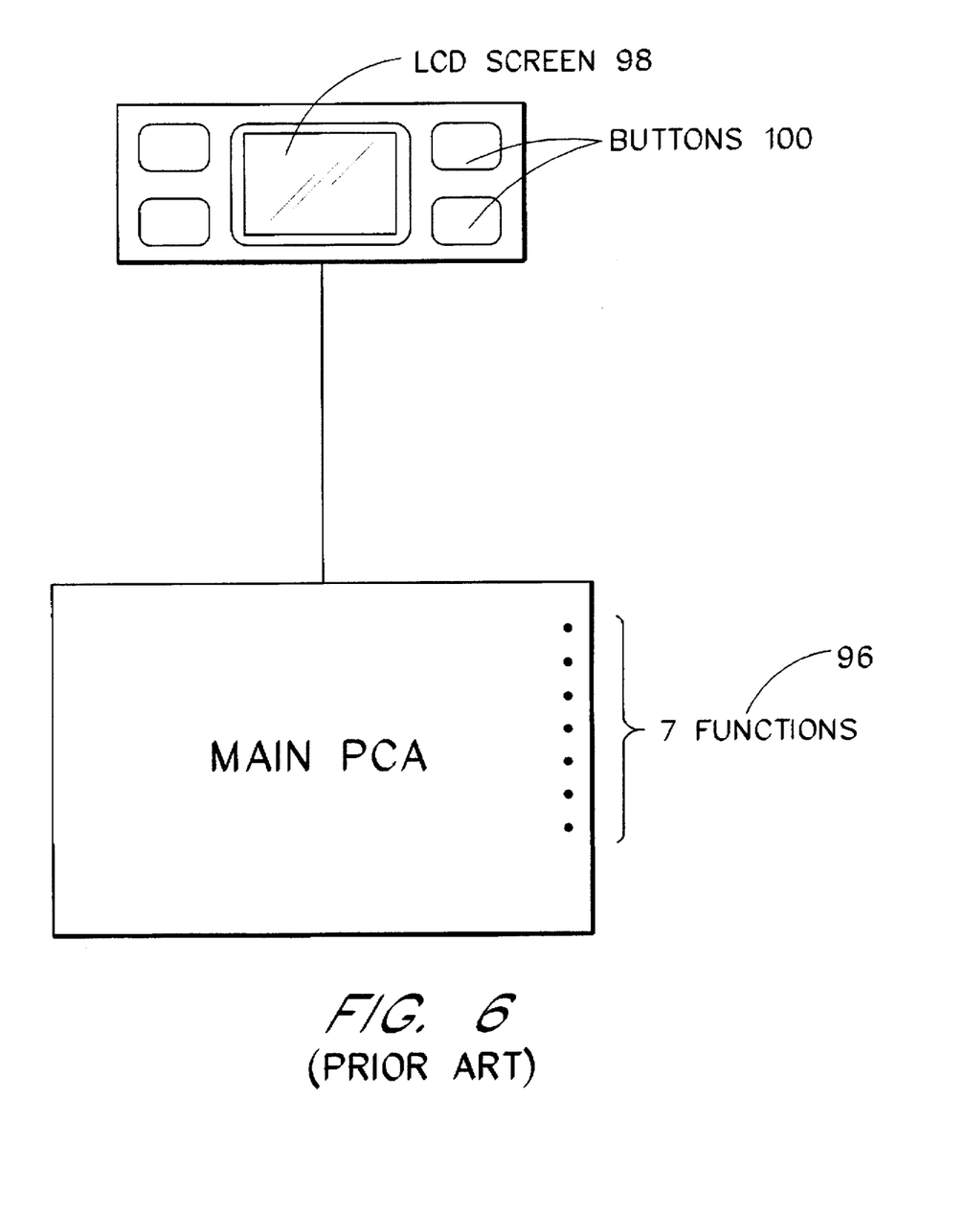
FIG. 6 is a schematic of a prior art printer control keyboard.

In FIG. 6 an overview of the user interface to the printer is pictured. A series of seven function keys 96 on the right side of the printer, a LCD screen display 98, and four access keys 100 (main, select, forward, backward) are the direct user interfaces to the printer. The seven function keys 96 allow the user to directly control printer functions such as pausing the machine to change ink cartridges and instructing the machine to cut the paper.

Four access keys 100 control a menu-driven LCD screen 98. The menu provides options such as calibration of the paper and carriage axis, setting print mode firing rates and number of carriage passes per swath. Detailed instructions on printer operation must also be input. For example, the printer may be set to emulate HPGL2. Memory allocations between input/output and rasterization of data are also sent through the menu driven LCD screen keyboard. Data speed communications between the printer and the host computer are chosen along with pen setting regarding color and width of the rasterized lines. The new design automates or renders unnecessary many of those controls.

New Printer "smart" Carriage Architecture

Figure 7:
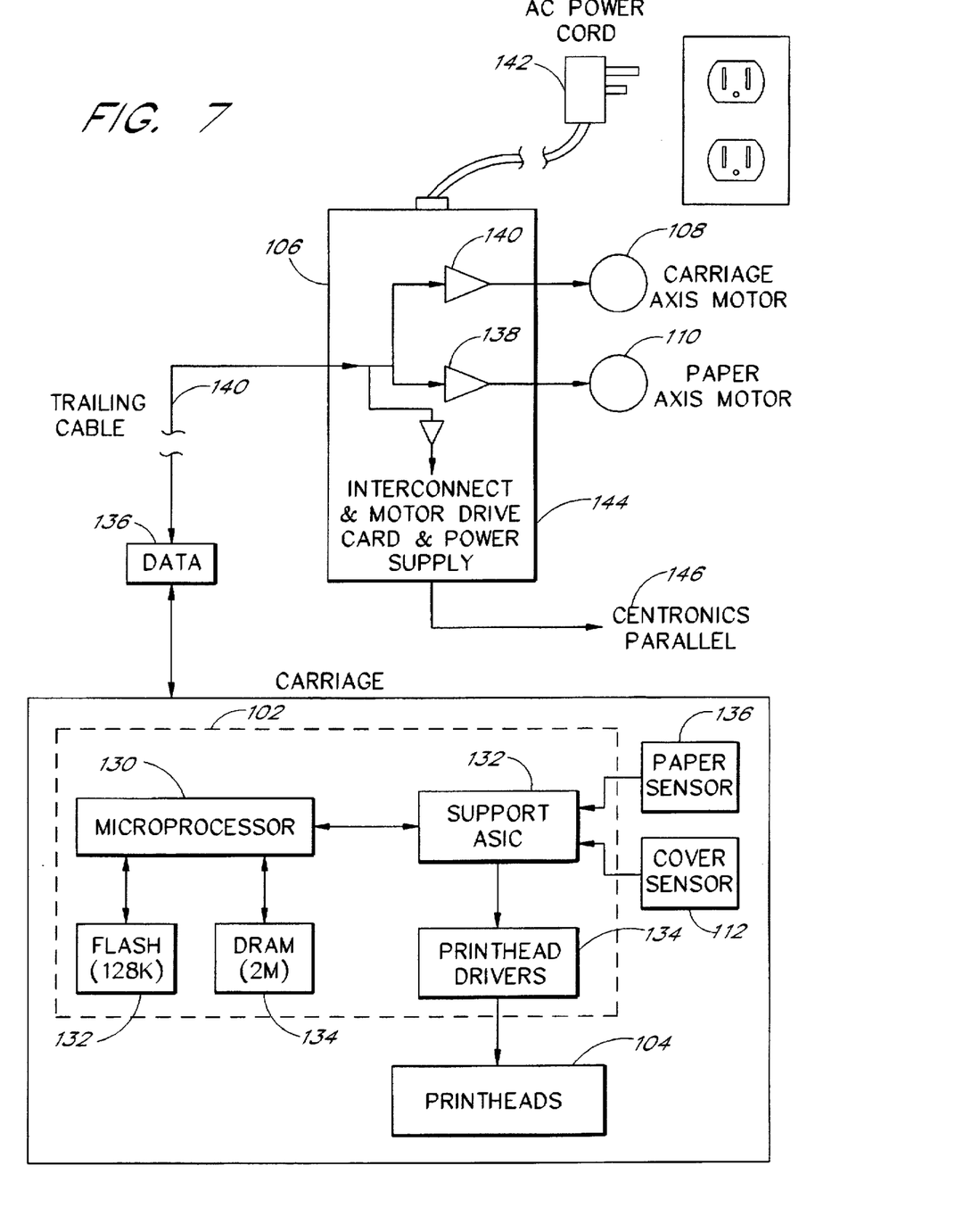
FIG. 7 is a block diagram of the "smart" carriage PCA which is mounted on the "smart" carriage, the associated interconnect PCA and the interconnections between the two PCAs.

FIG. 7 shows the overall design of a "smart" carriage architecture. The design uses a sophisticated carriage PCA 102 to directly process native raster data 104 from the host computer 14, thereby minimizing or completely eliminating the need for a main PCA. The new system eliminates many of the conversions necessary in the old print systems. The remaining functions formerly conducted by the traditional main PCA 16 are transferred to either the smart carriage PCA 102 or the host computer.

In a preferred embodiment, the host computer 14 does all the processing necessary to covert the data into a native raster form. Thus, the host computer does not convert data from the application into HPGL format as was often previously done. Instead, if the application already produces HPGL format data, the host computer converts the data directly into native raster format. If any parsing or translation is necessary, the host computer also performs those functions.

The host computer sends the compressed, native raster data directly to the carriage PCA 102. The carriage PCA controls the print heads 104. The carriage PCA 102 also processes information regarding carriage and paper position and sends the final instructions to an interconnect PCA 106 which controls motors 108, 110 which move the carriage and paper.

The Smart Carriage

Figure 8:
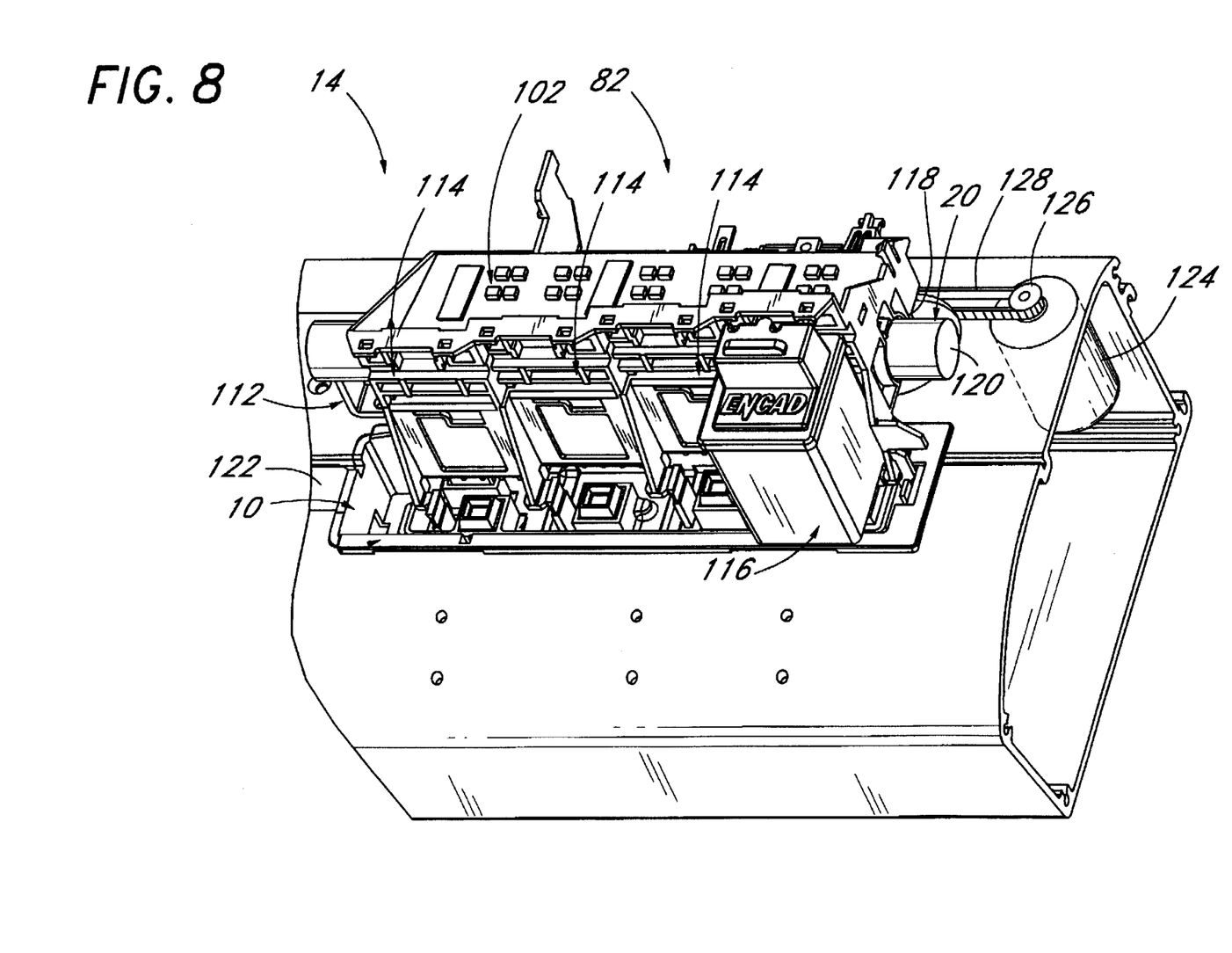
FIG. 8 is a schematic of the entire smart carriage including the smart carriage PCA mounted on top of the smart carriage.

The entire smart print carriage 82 is shown in FIG. 8. The print carriage supports a plurality of printer cartridge holders also referred to as cartridge receiving channels 114, each with a respective printer cartridge 116 removably mounted therein. In a preferred embodiment of a multiple color printer, the print carriage 82 includes at least four printer cartridge holders 114 and at least four respective printer cartridges 116. For simplicity, FIG. 8 illustrates the print carriage with only one print cartridge shown. The print carriage includes two split sleeves 118 which partially surround and slidably engage the guide rod 120 to support the print carriage 82 for linear movement of the carriage along the guide rod 120 along which the print carriage 82 moves. The print carriage 82 traverses a length of the platen 122 upon which printing can be accomplished. The length of the platen 122 is referred to as the printing path of the carriage 82. A motor 124, pulley 126, and a drive belt mechanism 128 are used to drive the print carriage 82 along the guide rod 120. The movement of the motor moving the print carriage is controlled by the electronics on the carriage PCA 102. The carriage PCA 102 is mounted on top of the carriage and connects to the host computer, the interconnect PCA, and the four print drivers.

A block diagram of the carriage PCA is shown in part of FIG. 7. The microprocessor 130 has ROM or FLASH 132 (electronically programmable EPROM) 132, which provides the instructions for the microprocessor 130. The FLASH contains software programming for the microprocessor. DRAM 134 stores information from both before and after processing by the microprocessor 130. The microprocessor 130 on the carriage PCA 102 processes the data 136 as it is received from the host computer (not shown).

The microprocessor 130 used on the "smart" carriage PCA is typically a 683XX family, although a variety of microprocessors may be used. The standardization of the host data output has reduced the microprocessor processing requirements, thereby increasing the variety of microprocessors which can be used.

The microprocessor 130 decompresses the native raster information received from the host computer and shuffles the information before sending the processed information to a support ASIC chip 132, also located on the carriage PCA. Although usually the ASIC 132 and the microprocessor 130 are two different chips, it is possible to incorporate both the functions of the microprocessor and the support ASIC into one chip.

The support ASIC 132 monitors information from the linear encoder and coordinates the flow of signals. In particular, the ASIC 132 sends instructions from the microprocessor 130 to the printhead drivers 134. Each printhead driver controls a printhead cartridge 104. Each cartridge contains approximately 104 jets. The support ASIC 132 also receives information from the paper sensor 136 and the cover sensor 112.

A paper sensor determines the presence and width of paper loaded into the printer. A cover sensor determines whether the cover is open. The support ASIC prevents firing of the printheads if the sensors determine either (1) that the print head is not positioned over a paper surface, or (2) if the cover is open. If the cover is open, the electronics pause the printer and move the carriage to a central position to facilitate changing of the print cartridge. Previously, such changes were made by entering pause commands through the keyboard menu.

Status information regarding the firing of printheads, positioning of the carriage over the paper and opening of the cover are all transferred from the support ASIC 132 and to the microprocessor 130. The carriage microprocessor 130 processes this information and determines appropriate carriage position and paper advancement. The processed instructions are then used to control the motors on the interconnect PCA 106. A trailing cable 140 or optical interconnects may be used to connect the carriage PCA with the interconnect PCA.

The interconnect PCA 106 contains the paper motor driver 138 and the carriage motor driver 140. The interconnect PCA 106 also contains the power circuitry 142 and the physical interconnect 144 which mates the centronics parallel cable 146 from the host computer to a trailing cable 140. As in the traditional interconnect PCA, the paper motor drivers 140, 138 buffer and amplify the signals to move the paper up and down, and the carriage motor 108 moves the carriage to the left or right, depending on the signal received from the carriage PCA 102. The processing of the signals that move the carriage and the paper are now executed on the carriage microprocessor 130 and the carriage support ASIC 132.

Figure 9:
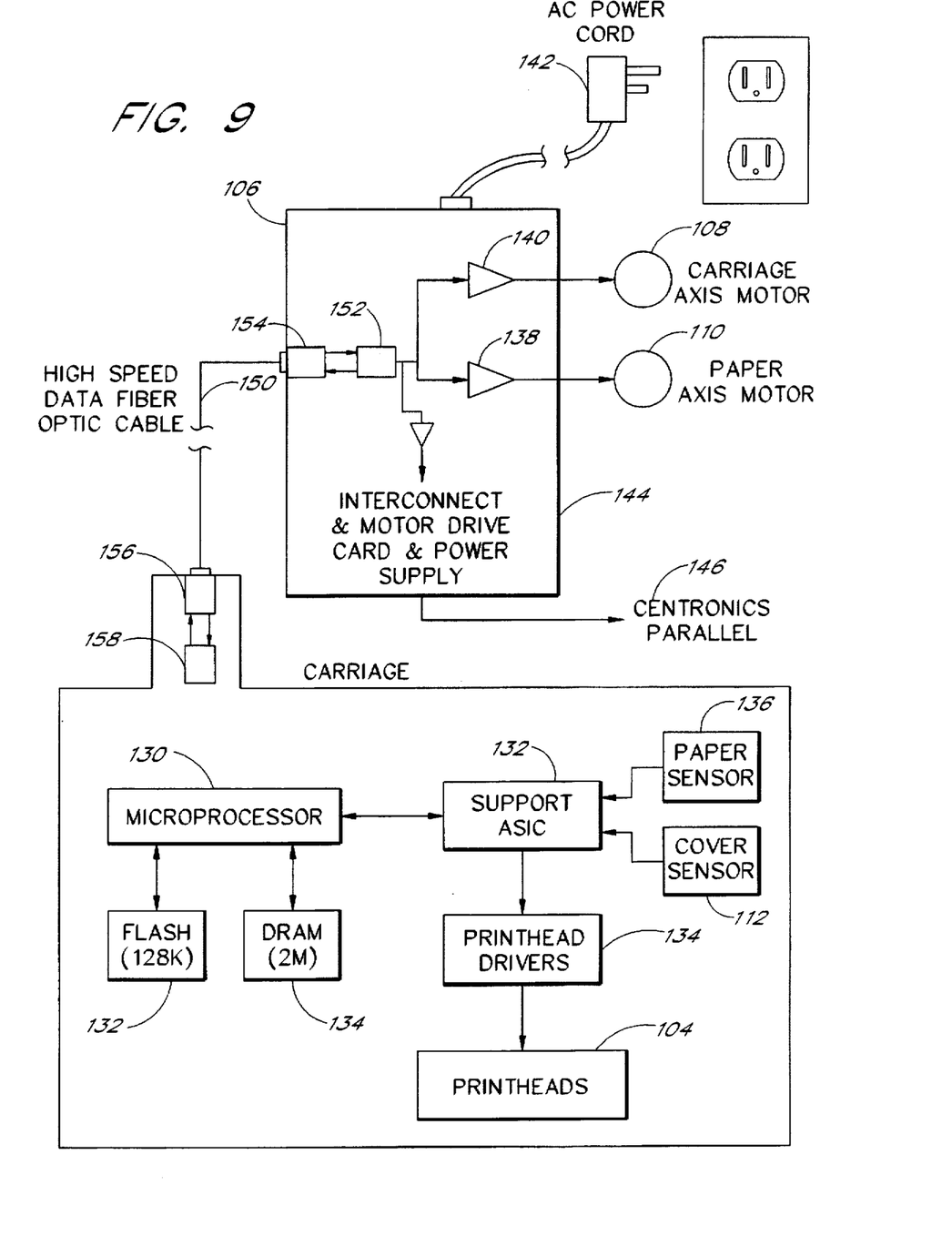
FIG. 9 is the smart carriage system implementing optical interconnects.

In a different embodiment, shown in FIG. 9, the trailing cable may be replaced by a high-speed fiber optic cable 150. If a fiber optic cable is used, interface IC 152 and transceiver 154 will be required on the interconnect PCA. A matching interface IC 156 and transceiver 158 will be required on the carriage PCA to convert the electronic digital signals into optical signals, and the optical signals back into digital signals. Using fiber optic methods of transferring information to the carriage PCA avoids many interference problems and enables the system to support higher data transfer speeds.

Advantages of the "Smart" Carriage Method

Communication electronics are simplified by decompressing and shuffling host computer data near the print heads 104. This simplification permits the elimination of some communications electronics. Eliminating an intermediate data stop at the main PCA board allows for the elimination of one set of multiplexer/demultiplexers and one set of line transceivers. Sending native raster data instead of multiplexed shuffled data also allows for more constant data transfer rates. Typical data transfer rates between the host computer 14 and the carriage PCA 102 are around 160 Kbytes per second, low enough to avoid generating radio frequency waves. The former design which sent uncompressed native raster data to the carriage required burst data transfer rates of up to 2 Mbytes per second. These high transfer rates sometimes generated radio frequency interference.

Standardizing the output from the host computer also eliminates processing steps. The host computer no longer has to convert some application outputs into HPGL only to be converted back to native raster by the printer electronics. Parsing and translation of the data occurs only if the data was originally in HPGL. In order to maintain backward compatibility, new software printer drivers replace the old printer drivers 20 in FIG. 1. These new software drivers determine if the originating applications data is in HPGL format or an RTL/HPGL merged format. If so, the driver uses the microprocessor (not shown) in the host computer to parse and translate the data into a native raster format.

The automated system also allows for the elimination of function keys 96, the keyboard 100, and the LCD screen 98 on the printer. Because the input from the host computer is standardized, the end user no longer has to select emulation modes and allocate memory in the printer. Even mundane functions, such as pausing the printer to reload ink has been implemented using a cover sensor 112 and electronics on the smart carriage. The implementation of the remaining control features using the keyboard and full size screen of the host computer allows for the use of a user friendly graphical interface.

Processing native rasterized data instead of HPGL and HPGL/RTL merged data eliminates the substantial memory requirements needed to store vector lists generated during the conversion process. As was previously described, the old method required storage of the entire vector list, which sometimes exceeded 32 Mbytes of memory before conversion to native raster could begin. The use of direct native raster transmissions avoids such large memory requirements.

Simplification of parsing and translation also significantly reduces the software/ROM requirements. The previous "mega-parser" program which handled HPGL and RTL data required over 150 commands to operate. The new translator which replaces the "mega-parser" requires approximately 8 commands to operate. Thus a substantial savings in ROM as well as RAM is achieved.

Finally, the new "smart" carriage speeds up printing of the printer data. The printer no longer has to wait for the host computer to send all of the data to a plot, and also for the printer to convert the entire plot before printing can begin. Instead, each swath of data can be printed as soon as it has been received and shuffled. The printing of the transmitted data during data transmission can result in significant time savings.

The invention and its advantages will be understood from the foregoing description and it will be apparent that various changes may be made in the form, construction and arrangements of the parts of the invention without departing from the spirit and scope thereof or sacrificing its material advantages. The arrangements described are merely by way of example. We do not wish to be restricted to the specific forms shown or uses mentioned except as defined in the following claims.

What is claimed is:

1. A printer including a carriage which traverses a print medium, said carriage comprising:
   a carriage circuit board mounted on said print carriage;
   a carriage circuit on said carriage circuit board, said carriage circuit designed to transfer data to and from a host computer; and
   a microprocessor mounted on said carriage circuit board, said microprocessor programmed to decompress data from said host computer.

2. The printer described in claim 1, wherein said carriage circuit board is further connected to a stationary interconnect circuit board located in said printer.

3. The printer of claim 1, wherein said microprocessor has been programmed to perform a packbits decompression of said data from said host computer.

4. The printer of claim 3, wherein said microprocessor has been programmed to perform a shuffle of said data from said host computer.

5. The printer of claim 2 wherein said carriage circuit board sends pulse width modulated signals to said stationary interconnect circuit board, said pulse width modulated signals used to determine movement of said print carriage.

6. The printer of claim 5 wherein said carriage circuit board sends signals used to drive a paper axis motor to advance a sheet of paper at the completion of a line.

7. The printer of claim 1 wherein said carriage circuit board is connected to a print head which places chemicals on a substrate in a predetermined arrangement.

8. The printer of claim 1 wherein said carriage circuit board is connected to a host computer which provides raster data to said carriage circuit board.

9. The printer of claim 2 wherein an optical interconnect is used to accomplish said connection between said carriage circuit board and said stationary interconnect circuit board.

10. The printer of claim 1 wherein data from said host computer is sent in raster format and compressed using packbits, and output of said printer carriage circuit includes two sets of control signals for two motors controlling movement of said printer carriage and movement of paper loaded in said printer.

11. The printer of claim 1 wherein said carriage circuit board receives data from said host computer in raster format.

12. A printer carriage for use in a printer, said printer carriage comprising:
   a carriage circuit board mounted on said printer carriage;
   a microprocessor mounted on said carriage circuit board, said microprocessor programmed to process and to decompress data from a host computer; and
   a printhead driver mounted on said printer carriage.

13. The printer carriage of claim 12, wherein said printer carriage further comprises a paper sensor for sensing the presence of paper in the printer.

14. The printer carriage of claim 12 wherein said carriage circuit board is connected directly to said host computer using a trailing cable such that data sent by said host computer is in a raster form and data received by said carriage circuit board is in said raster form.

15. The printer carriage of claim 12, wherein said printer is a large format printer and said printer carriage further comprises a cover sensor for determining whether the cover of said printer is open.

16. The printer carriage of claim 12, wherein said printer carriage circuit board mounted on said printer carriage is connected to said host computer via an interconnect circuit board.

17. The printer carriage of claim 12, wherein said printer carriage further comprises multiple cartridges, each cartridge comprising multiple jets.

18. A method for processing and transferring information from a computer to a printer having a moving carriage and a print driver, said method comprising the steps of:
   providing a carriage circuit on said printer carriage;
   sending information in a first format from a host computer to said carriage circuit;
   decompressing said information in said first format, said decompressing occurring in said carriage circuit;
   shuffling said information in said carriage circuit; and
   sending said decompressed, shuffled information to said print driver.

19. The method for processing and transferring information from a computer to a print driver described in claim 18, wherein said information is first converted to optical form using an interface IC and transceiver mounted in an interconnect circuit before said information is sent to said carriage circuit.

20. The method for processing and transferring information from a computer to a print driver described in claim 18, wherein said host computer sends said information in a raster form and said printer carriage circuit receives said information from said host computer in a raster form.

21. The method for processing and transferring information from a computer to a print driver described in claim 20, wherein said host computer first parses and translates vector data before sending said data in said raster format to said printer carriage circuit.

22. The method for processing and transferring information from a computer to a print driver described in claim 18, wherein said method includes the additional steps of:

receiving and processing in said carriage circuit data from an optical line sensor, said data used to determine appropriate carriage movements; and sending control signals to an interconnect PCA, said control signals used to drive a carriage motor and a paper axis motor for properly controlling relative motions of paper and said printer carriage.

23. A system for printing on a sheet of paper data from a host computer, said system comprising:

a carriage axis motor connected to an interconnect circuit board;

a paper axis motor connected to said interconnect circuit board;

a carriage circuit board mounted on a carriage, said carriage circuit board connected to said interconnect circuit board;

a host computer connected to said carriage circuit board, said host computer programmed to send raster data to said carriage circuit board;

a microprocessor mounted on said carriage circuit board, said microprocessor programmed to decompress and shuffle data;

a memory chip connected to said microprocessor, said memory chip mounted on said carriage circuit board;

an ASIC chip connected to said microprocessor, said ASIC chip mounted on said carriage circuit board;

a printhead driver connected to said ASIC chip;

a printhead connected to said printhead driver; and a cover sensor connected to said ASIC chip.

24. The system of claim 23, wherein said connection between said host computer and said carriage circuit board is accomplished using a high speed data fiber optic cable, and:

wherein said interconnect circuit board further comprises a first interface IC and transceiver combination for converting information between an electrical and an optical format; and wherein said carriage circuit board further comprises a second interface IC and transceiver combination for converting information between said electrical and optical formats.

25. A printer for printing data on a sheet of paper, said printer comprising:

a host computer transmitting data in a raster format, a moving carriage connected to said host computer, a carriage circuit mounted on said moving carriage, said carriage circuit configured to receive said data in said raster format from said host computer, a microprocessor mounted on said moving carriage, said microprocessor programmed to process said data in said raster format from said host computer.

26. The printer of claim 25, wherein said host computer converts HPGL data to said raster format before transmitting said data in said raster format to said carriage.

27. The printer of claim 26, wherein said microprocessor on said carriage circuit shuffles said data from said host computer.

28. The printer of claim 25, wherein said printer prints data on said paper while simultaneously receiving said data in said raster format from said host computer.

29. The printer of claim 25, wherein said printer is a large format printer having a platen length greater than eighteen inches.

30. A method for processing and transferring information from a host computer to a print driver, said method comprising the steps of:

sending information in a raster format from a host computer;

providing a carriage circuit board on a moving printer carriage;

receiving said raster format information from said host computer on a microprocessor provided on said carriage circuit board;

shuffling said information on said carriage circuit board;

expelling ink onto paper from an inkjet mounted on said carriage, said expulsion of ink designed to form a predetermined patterned on a page.

31. The method for processing and transferring data described in claim 30, wherein said expelling of ink begins before an entire page of raster information has been transmitted by said host computer.

32. The method for processing and transferring data described in claim 30, wherein said method includes the additional step of:

converting HPGL data to said raster data, said conversion executed by circuitry located within said host computer.

33. The method for processing and transferring data described in claim 30, wherein Said method includes the additional step of:

compressing said raster data within said host computer and decompressing said raster data using said microprocessor mounted on said carriage circuit board.

* * * * *